(12) United States Patent
Wong et al.

(10) Patent No.: US 12,015,984 B2
(45) Date of Patent: Jun. 18, 2024

(54) TERMINAL DEVICE, SYSTEM AND METHODS

(71) Applicant: Sony Group Corporation, Tokyo (JP)

(72) Inventors: Shin Horng Wong, Basingstoke (GB); Martin Warwick Beale, Basingstoke (GB); Vivek Sharma, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 348 days.

(21) Appl. No.: 17/427,917

(22) PCT Filed: Feb. 7, 2020

(86) PCT No.: PCT/EP2020/053118
§ 371 (c)(1),
(2) Date: Aug. 3, 2021

(87) PCT Pub. No.: WO2020/165039
PCT Pub. Date: Aug. 20, 2020

(65) Prior Publication Data
US 2022/0110063 A1    Apr. 7, 2022

(30) Foreign Application Priority Data
Feb. 14, 2019   (EP) .................................... 19157314

(51) Int. Cl.
*G08C 17/00* (2006.01)
*H04W 24/02* (2009.01)
(Continued)

(52) U.S. Cl.
CPC ....... *H04W 52/0245* (2013.01); *H04W 24/02* (2013.01); *H04W 24/10* (2013.01)

(58) Field of Classification Search
CPC . H04W 52/0245; H04W 24/02; H04W 24/10; Y02D 30/70
(Continued)

(56) References Cited

U.S. PATENT DOCUMENTS 8,547,867 B2 * 10/2013 Koo ...................... H04W 88/06
370/465
8,811,341 B2 * 8/2014 Suzuki .............. H04W 36/0094
370/331
(Continued)

FOREIGN PATENT DOCUMENTS

EP          2690909 A2    1/2014
WO       2016/008730 A1   1/2016
(Continued)

OTHER PUBLICATIONS

International Search Report and Written Opinion dated Apr. 8, 2020, received for PCT Application PCT/EP2020/053118, Filed on Feb. 7, 2020, 10 pages.
(Continued)

*Primary Examiner* — Amancio Gonzalez
(74) *Attorney, Agent, or Firm* — XSENSUS LLP

(57) ABSTRACT

A terminal device for use in a wireless telecommunications network, the terminal device comprising receiver circuitry and processor circuitry, wherein the processor circuitry is configured: to measure a value of a parameter of a first radio signal received by the receiver circuitry; to determine, based on the value of the parameter of the first radio signal, a measurement constraint of a second radio signal received by the receiver circuitry; and to measure a value of a parameter of one or more second radio signals received by the receiver circuitry in accordance with the measurement constraint.

19 Claims, 6 Drawing Sheets

(51) Int. Cl.
*H04W 24/10* (2009.01)
*H04W 52/02* (2009.01)

(58) Field of Classification Search
USPC .......................................................... 370/311
See application file for complete search history.

(56) References Cited

U.S. PATENT DOCUMENTS

| | | | | |
|---|---|---|---|---|
| 8,897,259 B2* | 11/2014 | Kim | ...................... | H04W 36/30 |
| | | | | 455/437 |
| 9,204,316 B2* | 12/2015 | Suzuki | ................. | H04W 24/02 |
| 9,538,396 B2* | 1/2017 | Seo | ................... | H04W 36/0085 |
| 9,967,131 B2* | 5/2018 | Seo | ....................... | H04L 67/104 |
| 9,980,162 B2* | 5/2018 | Zhang | ...................... | H04L 1/20 |
| 10,200,939 B2* | 2/2019 | Yang | ..................... | H04L 5/0048 |
| 10,447,363 B2* | 10/2019 | He | ....................... | H04B 7/0613 |
| 10,601,483 B2* | 3/2020 | Davydov | ............. | H04L 5/0094 |
| 10,742,294 B2* | 8/2020 | Liu | ...................... | H04B 7/0473 |
| 10,757,697 B2* | 8/2020 | Wittenmark | .......... | H04W 76/27 |
| 11,006,445 B2* | 5/2021 | Zhou | .................... | H04L 5/0048 |
| 11,070,345 B2* | 7/2021 | Kwon | .................... | H04L 5/0051 |
| 11,122,642 B2* | 9/2021 | Zhou | ..................... | H04L 1/0057 |
| 11,128,359 B2* | 9/2021 | Zhou | ...................... | H04W 72/23 |
| 11,245,452 B2* | 2/2022 | Chen | ................... | H04B 7/0626 |
| 11,394,518 B2* | 7/2022 | Gao | ..................... | H04B 17/309 |
| 11,764,929 B2* | 9/2023 | Gao | ........................ | H04L 5/005 |
| | | | | 370/328 |
| 2014/0036708 A1* | 2/2014 | Ou | ...................... | H04W 36/165 |
| | | | | 370/252 |
| 2015/0163745 A1* | 6/2015 | Kim | ...................... | H04W 76/28 |
| | | | | 370/311 |
| 2016/0262077 A1 | 9/2016 | Zhang et al. | | |
| 2017/0026861 A1 | 1/2017 | Tseng et al. | | |
| 2019/0124690 A1* | 4/2019 | Siomina | ................ | H04W 24/10 |

FOREIGN PATENT DOCUMENTS

| | | |
|---|---|---|
| WO | 2018/127395 A1 | 7/2018 |
| WO | 2018/172382 A1 | 9/2018 |
| WO | 2018/172488 A1 | 9/2018 |
| WO | 2018/228865 A1 | 12/2018 |
| WO | 2020/064945 A1 | 4/2020 |

OTHER PUBLICATIONS

3GPP, "NR; Study on UE Power Saving (Release 16)", 3GPP TR 38.840 V0.1.0, Nov. 2018, pp. 1-24.
Holma et al., "LTE for UMTS OFDMA and SC-FDMA Based Radio Access", John Wiley and Sons, 2009, pp. 25-27.
Catt et al., "New SID: Study on UE Power Saving in NR", 3GPP TSG RAN Meetings #80, RP-181463, Jun. 11-14, 2018, 5 pages.

* cited by examiner

TERMINAL DEVICE, SYSTEM AND METHODS

CROSS REFERENCE TO RELATED APPLICATIONS

The present application is based on PCT filing PCT/EP2020/053118, filed Feb. 7, 2020, which claims priority to EP 19157314.6, filed Feb. 14, 2019, the entire contents of each are incorporated herein by reference.

BACKGROUND

Field of Disclosure

The present disclosure relates to a terminal device, system and methods for use in a wireless telecommunications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3$^{rd}$ Generation Partnership Project (3GPP) defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One area of interest is to reduce the power consumption of communications devices using wireless communications networks (e.g. those using 5G or NR networks) [1]. In particular, as the connectivity capability and types of data which may be transmitted by these communications devices continue to improve, reducing power consumption so as to improve battery life is becoming increasingly important.

SUMMARY OF THE DISCLOSURE

The present disclosure can help address or mitigate at least some of the issues discussed above.

The present disclosure is defined by the claims.

Respective aspects and features of the present disclosure are defined in the appended claims. It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
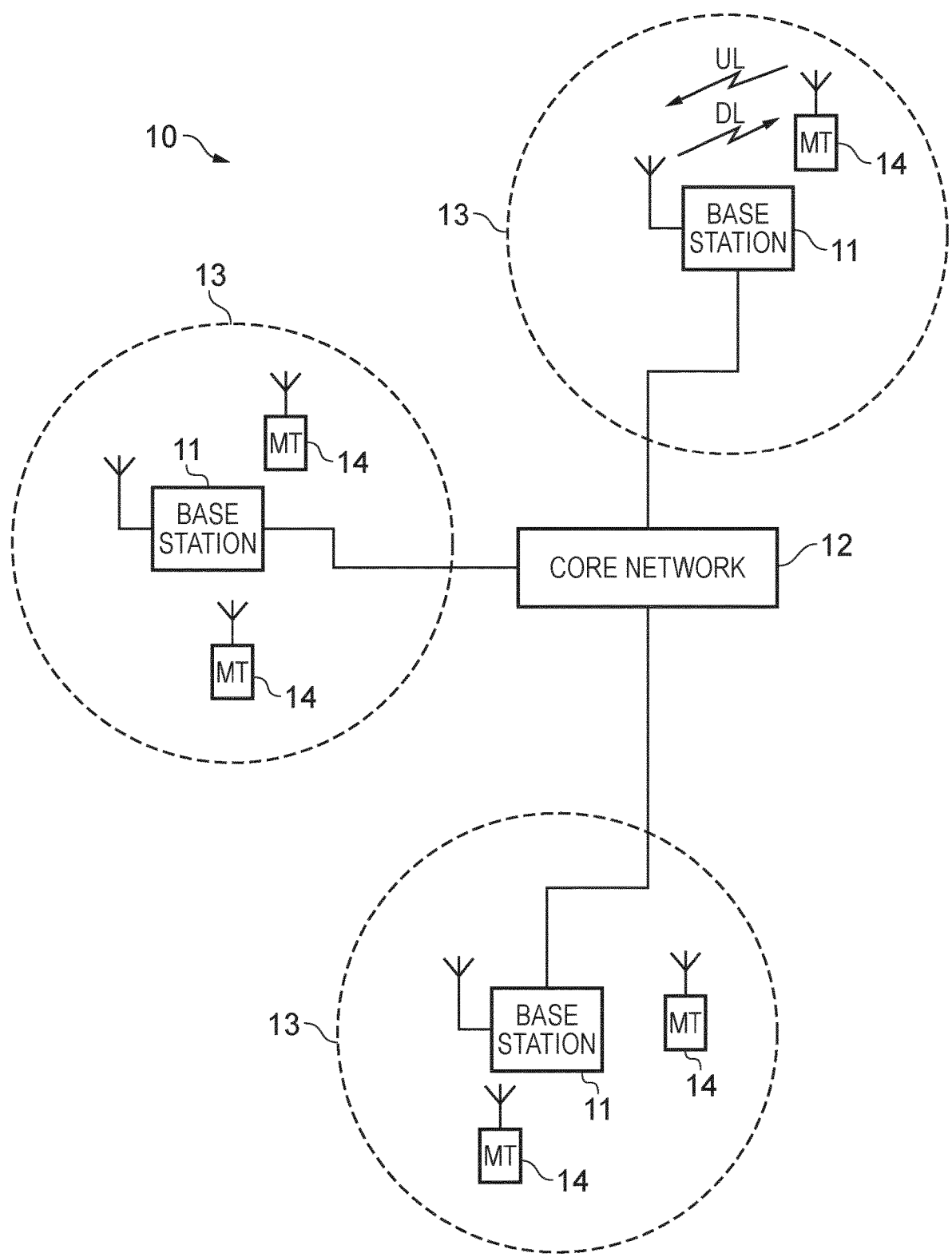
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

The elements of the wireless access network shown in FIG. 1 may be equally applied to a 5G new RAT configuration, except that a change in terminology may be applied as mentioned above.

Figure 2:
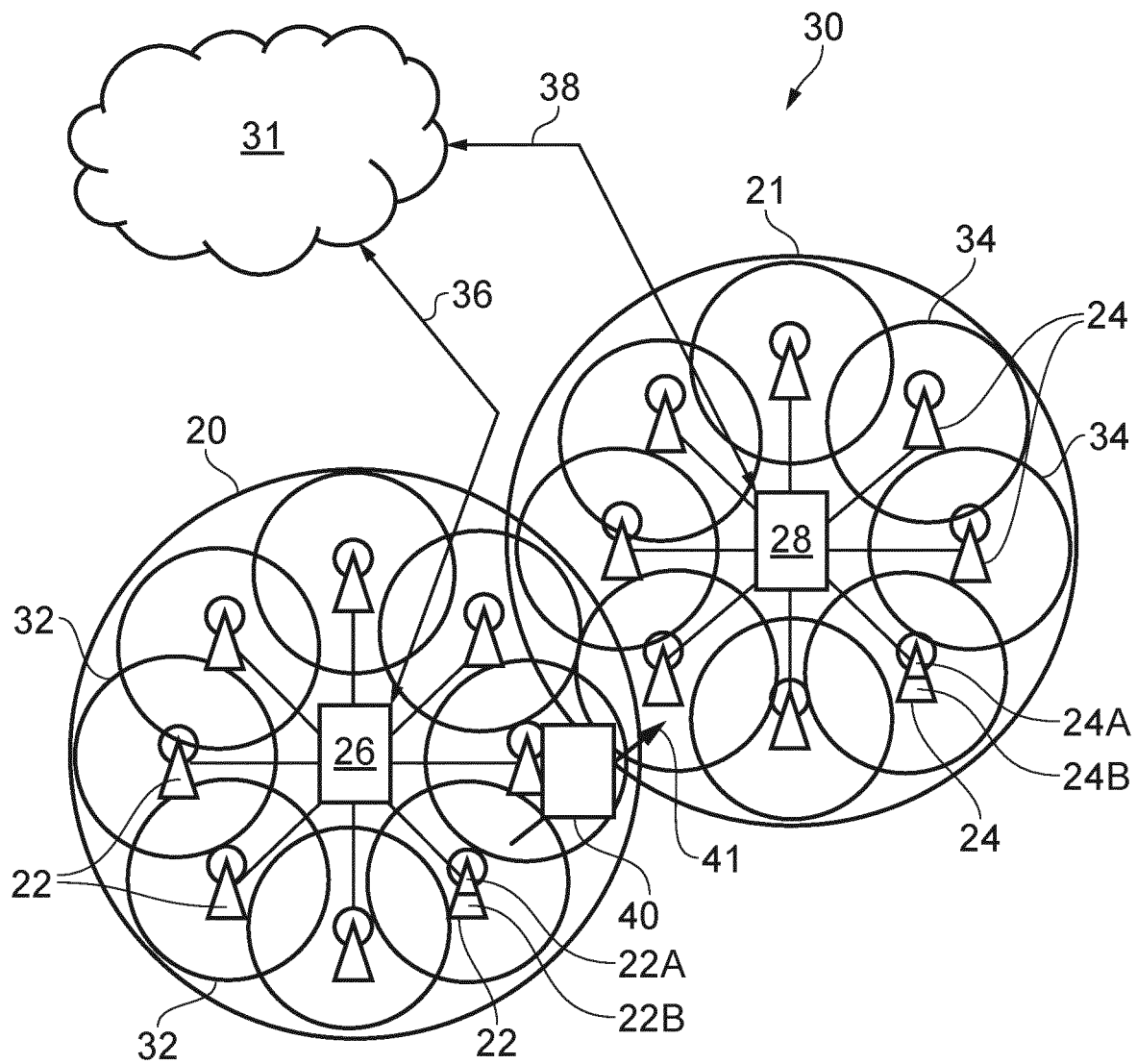
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22A, 24A for transmission and reception of wireless signals and processor circuitry 22B, 24B configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, gNodeB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Figure 3:
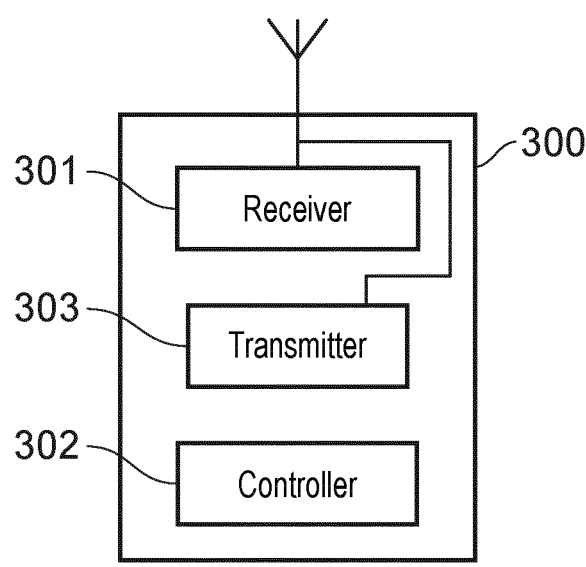
FIG. 3 schematically represents a terminal device in accordance with certain embodiments of the present disclosure.

FIG. 3 shows a terminal device 300 (e.g. terminal device 14 or terminal device 40) according to an embodiment. The terminal device 300 comprises a receiver 301 for receiving radio signals from the network (e.g. from a base station 11 or TRP 22, 24), a transmitter 303 for transmitting radio signals to the network (e.g. to a base station 11 or TRP 22, 24) and a controller 302 for controlling operation of the terminal device. In particular, the controller 302 controls the operation of the receiver 301 and the transmitter 303. Power is supplied to the terminal device from a battery (not shown), and the terminal device may comprise other features (such as buttons, a display and the like) which are not shown for the sake of simplicity. Each of the receiver 301, transmitter 303 and controller 302 are implemented via appropriate circuitry, for example. In particular, the controller 302 comprises processor circuitry for processing inputs to produce outputs based on electronic instructions (e.g. stored in a memory (not shown) of the controller).

In order to reduce the power consumption of terminal device (or UE) 300, the present technique recognizes that Radio Resource Management (RRM) measurements (including signal strength measurements) of both the serving cell (that is, active cell) and other cells (e.g. cells neighboring the active cell) performed by the UE increase UE power consumption. RRM measurements typically involve the UE performing periodic measurements on one or more neighboring cells and transmitting measurement reports to the serving cell. There are requirements specified in 3GPP on the accuracy of the measurements that the UE needs to perform. Based on these requirements, a UE can be designed to perform a certain number of measurements such that the required accuracy level can be achieved. Typically, the UE will perform such measurements during its Discontinuous Reception (DRX) "OFF" period, which then reduces the sleep time of the UE and thereby increases the UE power consumption. The present technique helps improve UE battery life by reducing the power consumption associated with performing RRM measurements.

Figure 4:
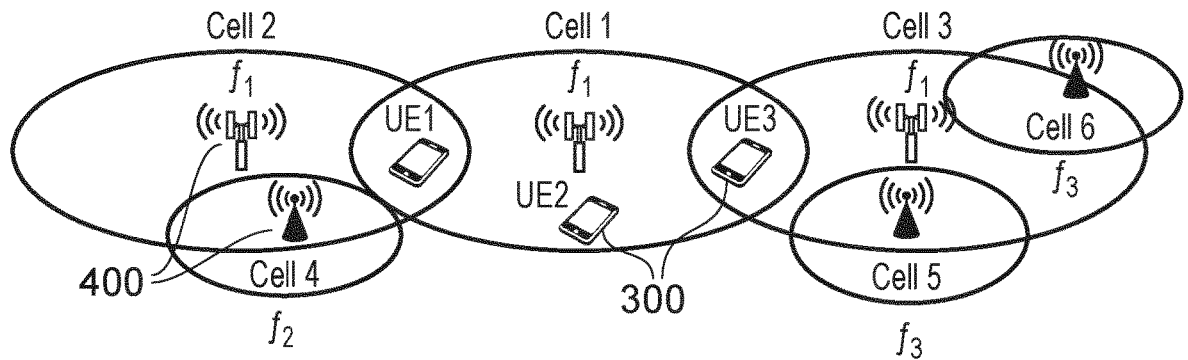
FIG. 4 schematically represents a wireless telecommunications network to which the present technique may be applied.

FIG. 4 demonstrates a problem addressed by the present technique. FIG. 4 shows a network comprising a plurality of cells, Cell 1 to Cell 6. Cells 1, 2 and 3 all operate at a first frequency $f_1$. Cell 4 operates at a second, different, frequency $f_2$. Cells 5 and 6 operate at a third, different, frequency $f_3$. Each cell is provided by respective infrastructure equipment 400 (e.g. base station 11 or TRP 22, 24) which forms a respective node of the network. In the described embodiments, a UE is able to distinguish between radio signals transmitted by infrastructure equipment of different cells operating at the same frequency based on, for example, information (such as a unique cell identifier) included in each radio signal which identifies the infrastructure equipment (and therefore the cell) from which it was transmitted.

There are some scenarios in which inter-frequency measurements of some of the cells are redundant. For example, in FIG. 4, it is desirable for UEs 300 to be able to move into any of the cells. Because some of the cells are at different frequencies, each UE thus needs to perform inter-frequency measurements (i.e. measurements on all frequencies $f_1$, $f_2$ and $f_3$). However, for UE1, there is no point in it measuring frequency $f_3$, since, given its current position (far from Cells 5 and 6), it is unlikely to see any cells with that frequency. Similarly, it is beneficial for UE3 to measure frequency $f_3$ rather than $f_2$, since, given its current position (near to Cells 5 and 6 but far from Cell 4), it is more likely to see cells in frequency $f_3$ than $f_2$. For UE2, there is little benefit for it to monitor $f_2$ and $f_3$ since, given its current position (far from both Cell 4 and Cells 5 and 6), it is unlikely to see any cells with these frequencies. However, in the current system, all of these UEs need to be configured to measure all frequencies $f_1$, $f_2$ & $f_3$. Making measurements across all frequencies in this way results in higher UE power consumption.

In order to alleviate this problem, the present technique introduces condition(s) which must be met before the UE starts performing specific RRM measurements. A specific RRM measurement is a RRM measurement taken in accordance with one of more specific measurement constraints, such as the specific radio frequency or frequencies at which measurements are made, the specific nodes of the network from which radio signals are measured and/or a specific measurement rate indicating how often measurements are to be made. By adjusting these constraints (and therefore changing the specific RRM measurement) depending on which condition(s) are met, the occurrence of redundant RRM measurements is reduced, thereby reducing UE power consumption.

In an embodiment, the condition relates to the signal strength or quality, such as the RSRP, of one or more pre-defined cells (e.g. one or more neighboring cells to the UE's active cell). In particular, the UE 300 will start a specific RRM measurement when the RSRP of a pre-defined neighbor cell exceeds a pre-defined threshold.

In one example, the specific RRM measurement is a measurement taken at a specific radio frequency or frequencies (the specific radio frequency or frequencies being the measurement constraint(s) which defines the specific RRM measurement). An example is explained according to FIG. 5, which is the same as FIG. 4 except that there is an additional cell (Cell 7 with frequency $f_1$). Here, the conditions are:

1) If the RSRP of Cell 2 at frequency $f_1$ exceeds threshold T1, then perform measurements on frequency $f_2$. Cell 2 is the pre-defined cell in this case (since it is the neighboring cell closest to Cell 4 with frequency $f_2$).
2) If the RSRP of Cell 3 or Cell 7 at frequency $f_1$ exceeds threshold T2, then perform measurements on frequency $f_3$. Cells 3 and 7 are the pre-defined cells in this case (since they are the neighboring cells closest to Cells 5 and 6 with frequency $f_3$).

In this example, all UEs 300 are firstly configured to measure cells in frequency $f_1$. As a UE, such as UE3, moves closer to Cell 3, the RSRP of Cell 3 will eventually exceed threshold T2, thereby triggering the $2^{nd}$ condition above. This results in the UE starting to measure frequency $f_3$ (thus allowing it to detect radio signals transmitted in Cell 5 and Cell 6). Since the UE is far from Cell 2 at this point, the RSRP of Cell 2 does not exceed threshold T1, and thus the $1^{st}$ condition is not met by UE3. UE3 thus measures 1 and $f_3$ only, and therefore does not waste energy by measuring frequency $f_2$. Similarly for UE1, its position (close to Cell 2 and far from Cell 3) means it will meet the $1^{st}$ condition but not the $2^{nd}$ condition. It will thus perform measurements on $f_2$ (and also $f_1$) but not $f_3$. For UE2, its position (far from both Cell 2 and Cells 3 and 7) means it does not meet either of the two conditions and hence it will only perform measurement on $f_1$. Thus, the specific RRM measurement of UE3 is measurements on frequencies $f_1$ and $f_3$, the specific RRM measurement of UE1 is measurements on frequencies $f_2$ and $f_1$ and the specific RRM measurement of UE2 is measurement on frequency $f_1$. In contrast, a conventional system would require each UE to monitor and measure all 3 frequencies $\{f_1, f_2, f_3\}$. Power consumption for each of UE1, UE2 and UE3 is therefore reduced. It will be appreciated that each UE may be configured with any number of conditions (i.e. not just two conditions, as exemplified above).

Figure 5:
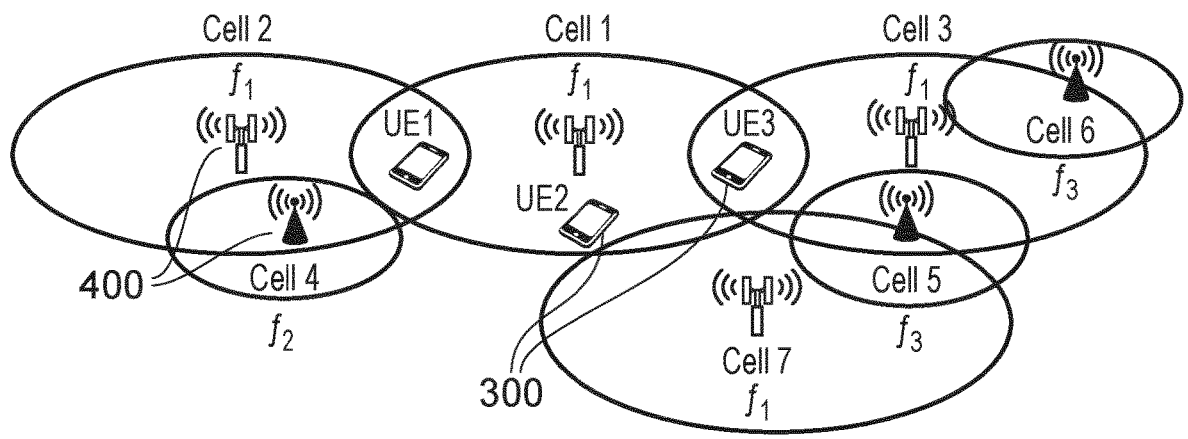
FIG. 5 schematically represents a first embodiment of the present technique.
Figure 6:
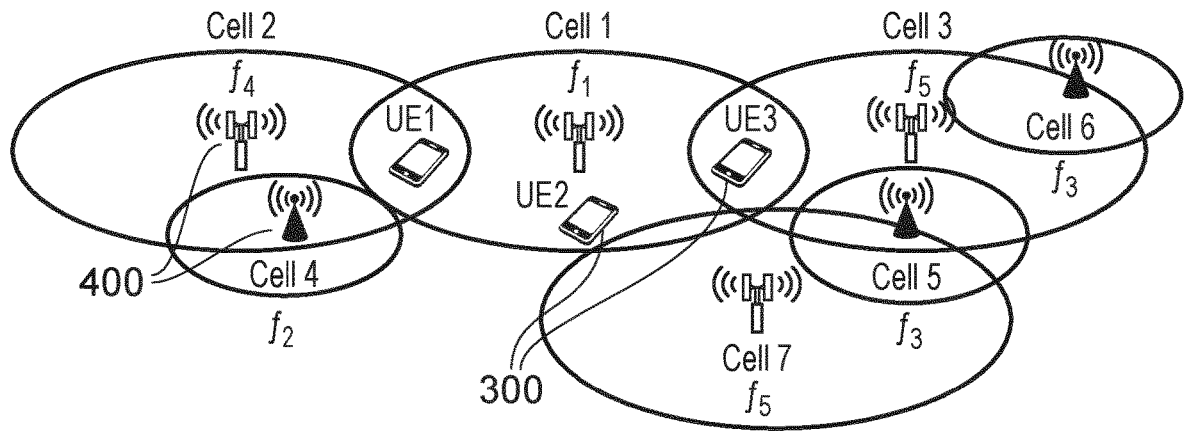
FIG. 6 schematically represents a second embodiment of the present technique.

FIG. 6 shows another example. FIG. 6 is the same as FIG. 5, except that some of the neighboring cells, Cells 1, 2, 3 and 7, operate at different frequencies to each other. In particular, although Cell 1 continues to operate at frequency $f_1$ (as before), Cell 2 now operates at a different frequency $f_4$ and Cell 3 & Cell 7 now both operate at a different frequency $f_5$. Cell 4 operates at frequency $f_2$ and Cell 5 & Cell 6 operate at frequency $f_3$, as before. Now, the conditions are:

1) If the RSRP of Cell 2 at frequency $f_4$ exceeds T1, then start measuring $f_4$, $f_2$ and $f_1$ and drop other frequencies. Again, Cell 2 is the pre-defined cell in this case (since it is the neighboring cell closest to Cell 4 with frequency $f_2$).
2) If the RSRP of Cell 3 or Cell 7 at frequency $f_5$ exceeds T2, then start measuring $f_5$, $f_3$ and $f_1$ and drop other frequencies. Again, Cells 3 and 7 are the pre-defined cells in this case (since they are the neighboring cells closest to Cells 5 and 6 with frequency $f_3$).

Such conditions are useful when, for example, there is a limit on the number of different frequencies a UE can be configured to measure. In this example, each UE has a limit of 3 different frequencies. The UE3 is initially configured to measure frequencies $f_1$, $f_4$ and $f_5$. However when it meets the $2^{nd}$ condition (e.g. when it moves close to Cell 3 so that the RSRP of Cell 3 exceeds T2), the UE stops measuring $f_4$ and starts measuring $f_3$ instead. The specific RRM measurement of UE3 is thus measurement of the specific frequencies $f_1$, $f_3$ and $f_5$. Similarly, UE1 is configured initially to measure frequency $f_1$, $f_4$ & $f_5$ but, as it gets close to Cell 2 (so that the RSRP of Cell 2 exceeds T1), the UE stops measuring $f_5$ and starts measuring $f_2$ instead. The specific RRM measurement of UE1 is thus measurement of the specific frequencies $f_1$, $f_2$ and $f_4$. For UE2, its position (far from both Cell 2 and Cells 3 and 7) means it does not meet either of the two conditions and hence it will continue to perform measurements on the original set of frequencies $f_1$, $f_4$ and $f_5$. The specific RRM measurement of UE2 thus remains measurement of the specific frequencies $f_1$, $f_4$ and $f_5$.

It is thus demonstrated how the present technique allows the number of frequencies measured by each UE to be limited (thereby reducing UE power consumption) whilst also maintaining a reliable connection between the UE and the network.

In a variation of the example of FIG. 6, the UE starts measuring a predetermined second frequency when a cell of a predetermined first frequency is detected (optionally, with a signal strength or quality, such as the RSRP, above a predetermined threshold). Thus, for example, the UE may be configured to start measuring radio signals with frequency $f_3$ in response to detecting any cell (e.g. Cell 3 in FIG. 6) transmitting at frequency $f_5$ (optionally, when the RSRP of $f_5$ radio signals exceed T2). Similarly, the UE may be configured to start measuring radio signals with frequency $f_2$ in response to detecting any cell (e.g. Cell 2 in FIG. 6) transmitting at frequency $f_4$ (optionally, when the RSRP of $f_4$ radio signals exceeds T1). Thus, the conditions in this example are:

1) If the frequency $f_4$ is detected at any cell (or, alternatively, if the RSRP measured at $f_4$ is above threshold T1), then start detecting and measuring radio signals transmitted at $f_2$.
2) If the frequency $f_5$ is detected at any cell (or, alternatively, if the RSRP measured at $f_5$ is above threshold T2), then start detecting and measuring radio signals transmitted at $f_3$.

The related frequencies (i.e. the second frequency which triggers measurement of the first frequency) and (if present) corresponding threshold are determined in accordance with the frequencies and relative location of adjacent cells, for example. It will be appreciated that, if no threshold is defined, measurement of the first frequency is triggered by detection of the second frequency (without the need for the signal strength or quality of the second frequency to exceed a threshold).

In another example, the specific RRM measurement is a measurement performed on radio signals received from one or more specific cells (the one or more specific cells being the measurement constraint(s) which defines the specific RRM measurement). An example is explained according to FIG. 7, which is the same as FIGS. 5 and 6 except that all the cells now operate at the same frequency (frequency $f_1$) except Cell 5 (which operates at a different frequency $f_3$). Now, the conditions are:

1) If the RSRP of Cell 2 is above threshold T1, then start detecting and measuring radio signals transmitted by Cell 4. Cell 2 is the pre-defined cell in this case (since it is the neighboring cell closest to Cell 4).
2) If the RSRP of Cell 3 or Cell 7 is above threshold T2, then start detecting and measuring radio signals transmitted by Cell 5 (where Cell 5 operates at frequency $f_3$). Cells 3 and 7 are the pre-defined cells in this case (since they are the neighboring cells closest to Cell 5).
3) If the RSRP of Cell 3 is above threshold T3, then start detecting and measuring radio signals transmitted by Cell 6. Cell 3 is the pre-defined cell in this case (since it is the neighboring cell closest to Cell 6).

In this example, the initial neighbor cells for all UEs (UE1, UE2, UE3) in Cell 1 are {Cell 2, Cell 3, Cell 7}. The initial specific RRM measurement of each UE in Cell 1 is thus measurement of radio signals transmitted by Cells 1, 2, 3 and 7. Using the conditions above, UE1 adds Cell 4 to its measurement as it moves closer to Cell 2 (so that the RSRP of Cell 2 exceeds T1). The specific RRM measurement of UE1 is thus measurement of radio signals transmitted by Cell 4 as well as the initial Cells 1, 2, 3 and 7. UE3 adds Cell 5 and Cell 6 to its measurement as it moves closer to Cell 3 (so that the RSRP of Cell 3 exceeds both T2 and T3). The specific RRM measurement of UE3 is thus measurement of radio signals transmitted by Cells 5 and 6 as well as initial Cells 1, 2, 3 and 7. UE2 adds Cell 5 to its measurement as it moves closer to Cell 7 (so that the RSRP of Cell 7 exceeds T2). The specific RRM measurement of UE2 is thus measurement of radio signals transmitted by Cell 5 as well as initial Cells 1, 2, 3 and 7. New cells from which to measure radio signals are thus added for each UE (thus adjusting the specific RRM measurement of that UE) as and when necessary according to the above-mentioned conditions. In contrast, a conventional system requires each UE to measure all neighbor cells, i.e. {Cell 2, Cell 3, Cell 4, Cell 5, Cell 6, Cell 7} as well as the serving cell, Cell 1. The reduced number of cells from which radio signals must be measured thus reduces power consumption.

Figure 7:
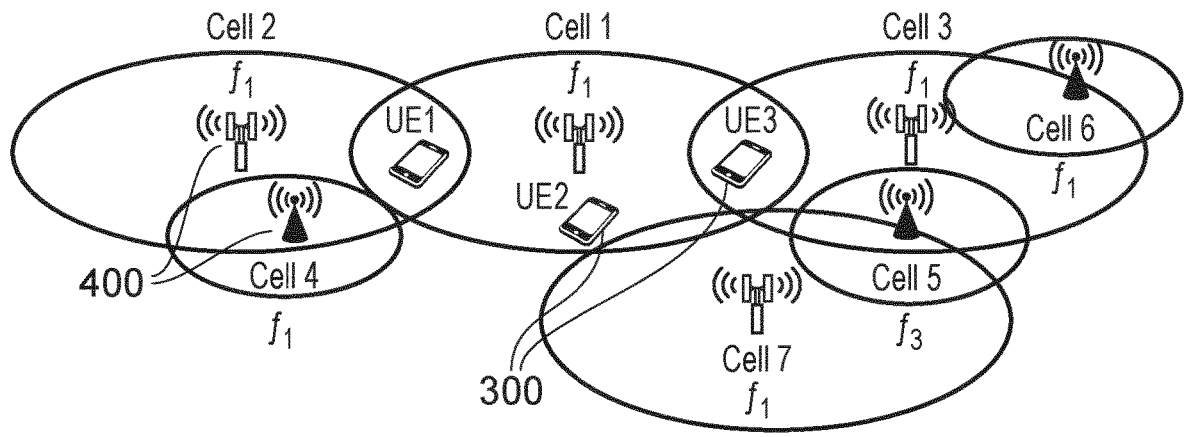
FIG. 7 schematically represents a third embodiment of the present technique.

In the example of FIG. 7, it will be appreciated that radio signal measurement of added cells may be dropped again when the relevant one(s) of the above-mentioned conditions are no longer satisfied. For example, if UE1 (after moving towards Cell 2 and adding Cell 4 measurement) starts moving away from Cell 2 so that the RSRP of Cell 2 is no longer above T1, then UE1 may stop detecting and measuring radio signals transmitted by Cell 4. This further helps reduce power consumption.

It will be appreciated that, in the embodiments described so far, the threshold values (for example T1, T2, T3) can take any value, including zero (zero being linear zero=minus infinity dBm). When a threshold has the value zero, the condition for adjusting the specific RRM measurement (e.g. by adding frequencies and/or cells) equates to whether or not radio signals from the cell and/or at frequency with which the threshold is associated is detected. For example, referring to FIG. 7, the following conditions can apply when the thresholds are zero:
1) If radio signals from Cell 2 are detected, then start detecting and measuring radio signals transmitted by Cell 4. Cell 2 is the pre-defined cell in this case (since it is the neighboring cell closest to Cell 4).
2) If radio signals from Cell 3 or Cell 7 are detected, then start detecting and measuring radio signals transmitted by Cell 5 (where Cell 5 operates at frequency $f_3$). Cells 3 and 7 are the pre-defined cells in this case (since they are the neighboring cells closest to Cell 5).
3) If radio signals from Cell 3 are detected, then start detecting and measuring radio signals transmitted by Cell 6. Cell 3 is the pre-defined cell in this case (since it is the neighboring cell closest to Cell 6).

It will be appreciated that similar considerations may be made for the other embodiments. That is, the specific RRM measurement is adjusted by changing the cells and/or frequencies which are measured in response to radio signals from a specific cell and/or at a specific frequency being detected (rather than waiting until the quality or strength of those radio signals exceeds a non-zero threshold).

In another embodiment, the condition relates to the rate of change of signal strength or quality (such as the RSRP) of one or more pre-defined cells (e.g. the active cell and/or one or more neighboring cells to the UE's active cell), and the specific RRM measurement is the measurement rate of the signal strength or quality (such as the RSRP) of the one or more pre-defined cells or another cell.

For example, the conditions may be:
1) If the change in RSRP of the active cell within 4 RSRP measurement periods is within a delta D1 then the UE reduces its RSRP measurement rate of the active cell by half.
2) If the change in RSRP of the active cell within 4 RSRP measurement periods is above delta D2 then the UE doubles its RSRP measurement rate (or the UE uses a default RSRP measurement rate) of the active cell.

Thus, for example, the UE may be required to perform 10 RSRP measurements in 100 ms to provide a targeted accuracy. If after 4 RSRP measurements, the RSRP hardly changes, i.e. within delta D1, then there isn't any point having such frequent measurements and so the measurement rate can be reduced to 5 RSRP measurements in 100 ms. Reducing the RSRP measurement rate reduces the power consumption of the UE.

It will be appreciated that the RSRP (or other signal strength or quality measure) of which the rate of change is measured and the RSRP (or other signal strength or quality measure) of which the measurement rate is adjusted may belong to the same cell (as applicable to the above-mentioned conditions) or different cells (e.g. in FIG. 5, UE1 may adjust the RSRP measurement rate of signals transmitted by Cell 4 depending on the RSRP rate of change of signals transmitted by Cell 2).

In embodiments, information indicative of the conditions for determining the specific RRM measurements (e.g. which cells or frequencies to detect, what the thresholds (if any) are and what to do when a particular cell or frequency is detected (optionally, with a measurement above a threshold) is transmitted to the UE by the active cell (e.g. through Radio Resource Control, RRC, signaling when a UE first connects to that cell). This information is stored in a storage medium (not shown) of the UE 300 (the storage medium being a solid state storage medium formed as part of the controller 302, for example).

In embodiments, when the specific RRM measurement carried out by a UE changes (e.g. to include measurements of other frequencies and/or cells or if measurements are carried out at a different rate), any new measurements are included in the measurement report(s) transmitted to by the UE in its active cell.

In embodiments, it will be appreciated that the expression "measurement of a radio signal" (or similar) actually refers to measurement of a characteristic of the radio signal, such as radio signal strength or quality (e.g. the RSRP of the radio signal). It will also be appreciated that the expression "radio signal transmitted from a cell" (or similar) actually refers to a radio signal transmitted from infrastructure equipment defining that cell.

Figure 8:
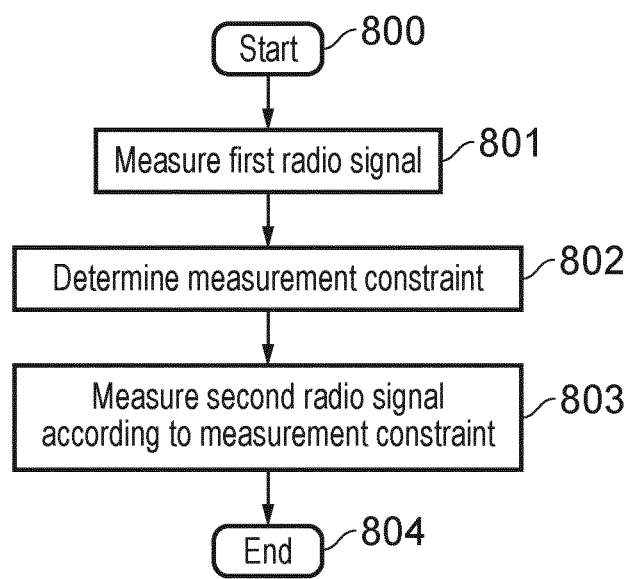
FIG. 8 shows a flow chart representing a method in accordance with certain embodiments of the present disclosure.

FIG. 8 shows a flow chart showing a method implemented by the UE 300 according to an embodiment. The method starts at step 800. At step 801, one or more parameters (e.g. the transmitting cell, radio frequency, RSRP and/or rate of change of RSRP) of a first radio signal received by the receiver 301 (e.g. as transmitted by a pre-defined cell) is measured. At step 802, a measurement constraint (e.g. one or more specific frequencies, one or more specific cells other than the pre-defined cell or a specific measurement rate) of a second radio signal received by the receiver 301 is determined, based on the value of the one or more parameters of the first radio signal. At step 803, a value of a parameter (e.g. RSRP) of one or more second radio signals received by the receiver 301 (e.g. as transmitted by one or more respective cells, such as the pre-defined cell from which the first radio signal is transmitted or one or more different cells) is measured in accordance with the measurement constraint (e.g. measurements are made at one or more specific frequencies or on second radio signals transmitted from one or more specific cells). The method ends at step 804.

The following numbered paragraphs provide further example aspects and features of the present technique:

1. A terminal device for use in a wireless telecommunications network, the terminal device comprising receiver circuitry and processor circuitry, wherein the processor circuitry is configured:
   to measure a value of one or more parameters of a first radio signal received by the receiver circuitry;
   to determine, based on the value of the one or more parameters of the first radio signal, a measurement constraint of a second radio signal received by the receiver circuitry; and
   to measure a value of a parameter of one or more second radio signals received by the receiver circuitry in accordance with the measurement constraint.
2. A terminal device according to paragraph 1, wherein:
   the measurement constraint is a one or more of a plurality of radio frequencies; and
   the processor circuitry is configured to measure the value of the parameter of the one or more second radio signals when the one or more second radio signals are received at the one or more of the plurality of radio frequencies.
3. A terminal device according to paragraph 1 or 2, wherein:
   the measurement constraint is a specific one or more of a plurality of nodes of the network; and
   the processor circuitry is configured to measure the value of the parameter of the specific one or more second radio signals when the one or more second radio signals are received from the one or more of the plurality of nodes of the network.
4. A terminal device according to any preceding paragraph, wherein:
   the first radio signal is received from one node of the network; and
   the one or more second radio signals are received from one or more respective different nodes of the network.
5. A terminal device according to paragraph 4, wherein the node from which the first radio signal is received is a node of a cell of the network located closest to the one or more different nodes from which the one or more second radio signals are received.
6. A terminal device according to any preceding paragraph, wherein one of the one or more parameters of the first radio signal is a reference signal received power, RSRP, of the first radio signal.
7. A terminal device according to paragraph 6, wherein the processor circuitry is configured to measure the value of the parameter of each of the one or more second radio signals when the RSRP of the first radio signal meets a predetermined respective threshold.
8. A terminal device according to any preceding paragraph, wherein one of the one or more parameters of the first radio signal is a specific node of the network from which the first radio signal is received.
9. A terminal device according to any preceding paragraph, wherein one of the one or more parameters of the first radio signal is a radio frequency of the first radio signal.
10. A terminal device according to any preceding paragraph, wherein:
    the measurement constraint is a rate of how often the value of the parameter of the one or more second radio signals is measured; and
    the processor circuitry is configured to measure the value of the parameter of the one or more second radio signals at the determined rate.
11. A terminal device according to paragraph 10, wherein:
    the parameter of the first radio signal is a rate of change of a reference signal received power, RSRP, of the first radio signal; and
    the processor circuitry is configured to change the rate of how often the value of the parameter of the one or more second radio signals is measured when the rate of change of the RSRP of the first radio signal meets a predetermined respective threshold.
12. A wireless telecommunications system comprising:
    a terminal device according to any preceding paragraph;
    first infrastructure equipment configured to transmit a first radio signal; and
    second infrastructure equipment configured to transmit a second radio signal.
13. A method of operating a terminal device for use in a wireless telecommunications network, the method comprising:
    measuring a value of one or more parameters of a first radio signal received by the terminal device;
    determining, based on the value of the one or more parameters of the first radio signal, a measurement constraint of a second radio signal received by the terminal device; and
    measuring a value of a parameter of one or more second radio signals received by the terminal device in accordance with the measurement constraint.
14. A program for controlling a computer to perform a method according to paragraph 12.
15. A storage medium storing a program according to paragraph 14.
16. Circuitry for a terminal device for use in a wireless telecommunications network, the circuitry comprising receiver circuitry and processor circuitry, wherein the processor circuitry is configured:
    to measure a value of one or more parameters of a first radio signal received by the receiver circuitry;
    to determine, based on the value of the one or more parameters of the first radio signal, a measurement constraint of a second radio signal received by the receiver circuitry; and
    to measure a value of a parameter of one or more second radio signals received by the receiver circuitry in accordance with the measurement constraint.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-181463, "New SID: Study on UE Power Saving in NR," CATT, CMCC, vivo, CATR, Qualcomm, MediaTek, RAN #80
[2] LTE for UMTS: OFDMA and SC-FDMA Based Radio Access, Harris Holma and Antti Toskala, Wiley 2009, ISBN 978-0-470-99401-6.

The invention claimed is:

1. A terminal device for use in a wireless telecommunications network, the terminal device comprising:
   receiver circuitry; and
   processor circuitry configured to:
      measure a value of one or more parameters of a first radio signal received by the receiver circuitry;
      determine, based on the value of the one or more parameters of the first radio signal, a measurement constraint of a second radio signal received by the receiver circuitry; and
      measure a value of a parameter of one or more second radio signals received by the receiver circuitry in accordance with the measurement constraint, wherein
   one of the one or more parameters of the first radio signal is a radio frequency of the first radio signal.

2. The terminal device according to claim 1, wherein:
   the measurement constraint is a one or more of a plurality of radio frequencies; and
   the processor circuitry is configured to measure the value of the parameter of the one or more second radio signals when the one or more second radio signals are received at the one or more of the plurality of radio frequencies.

3. The terminal device according to claim 1, wherein:
   the measurement constraint is a specific one or more of a plurality of nodes of the wireless telecommunications network; and
   the processor circuitry is configured to measure the value of the parameter f the specific one or more second radio signals when the one or more second radio signals are received from the one or more of the plurality of nodes of the wireless telecommunications network.

4. The terminal device according to claim 1, wherein:
   the first radio signal is received from one node of the wireless telecommunications network; and
   the one or more second radio signals are received from one or more respective different nodes of the wireless telecommunications network.

5. The terminal device according to claim 4, wherein the node from which the first radio signal is received is a node of a cell of the wireless telecommunications network located closest to the one or more different nodes from which the one or more second radio signals are received.

6. The terminal device according to claim 1, wherein one of the one or more parameters of the first radio signal is a reference signal received power (RSRP) of the first radio signal.

7. The terminal device according to claim 6, wherein the processor circuitry is configured to measure the value of the parameter of each of the one or more second radio signals when the RSRP of the first radio signal meets a predetermined respective threshold.

8. The terminal device according to claim 1, wherein another one of the one or more parameters of the first radio signal is a specific node of the wireless telecommunications network from which the first radio signal is received.

9. The terminal device according to claim 1, wherein:
   the measurement constraint is a rate of how often the value of the parameter of the one or more second radio signals is measured; and
   the processor circuitry is configured to measure the value of the parameter of the one or more second radio signals at the rate.

10. The terminal device according to claim 9, wherein:
   the parameter of the first radio signal is a rate of change of a reference signal received power (RSRP) of the first radio signal; and
   the processor circuitry is configured to change the rate of how often the value of the parameter of the one or more second radio signals is measured when the rate of change of the RSRP of the first radio signal meets a predetermined respective threshold.

11. A wireless telecommunications system, comprising:
   the terminal device according to claim 1;
   a first infrastructure equipment configured to transmit the first radio signal; and
   a second infrastructure equipment configured to transmit the second radio signal.

12. A method of operating a terminal device for use in a wireless telecommunications network, the method comprising:
   measuring a value of one or more parameters of a first radio signal received by the terminal device;
   determining, based on the value of the one or more parameters of the first radio signal, a measurement constraint of a second radio signal received by the terminal device; and
   measuring a value of a parameter of one or more second radio signals received by the terminal device in accordance with the measurement constraint, wherein one of the one or more parameters of the first radio signal is a radio frequency of the first radio signal.

13. A terminal device for use in a wireless telecommunications network, the terminal device comprising:
receiver circuitry; and
processor circuitry configured to:
  measure a value of one or more parameters of a first radio signal received by the receiver circuitry;
  determine, based on the value of the one or more parameters of the first radio signal, a measurement constraint of a second radio signal received by the receiver circuitry; and
  measure a value of a parameter of one or more second radio signals received by the receiver circuitry in accordance with the measurement constraint, wherein:
the measurement constraint is a rate of how often the value of the parameter of the one or more second radio signals is measured; and
the processor circuitry measures the value of the parameter of the one or more second radio signals at the rate.

14. The terminal device according to claim 13, wherein:
the first radio signal is received from one node of the wireless telecommunications network; and
the one or more second radio signals are received from one or more respective different nodes of the wireless telecommunications network.

15. The terminal device according to claim 14, wherein the node from which the first radio signal is received is a node of a cell of the wireless telecommunications network located closest to the one or more different nodes from which the one or more second radio signals are received.

16. The terminal device according to claim 13, wherein one of the one or more parameters of the first radio signal is a reference signal received power (RSRP) of the first radio signal.

17. The terminal device according to claim 13, wherein one of the one or more parameters of the first radio signal is a specific node of the wireless telecommunications network from which the first radio signal is received.

18. The terminal device according to claim 17, wherein the processor circuitry is configured to measure the value of the parameter of each of the one or more second radio signals when the RSRP of the first radio signal meets a predetermined respective threshold.

19. A wireless telecommunications system, comprising:
the terminal device according to claim 13;
a first infrastructure equipment configured to transmit the first radio signal; and
a second infrastructure equipment configured to transmit the second radio signal.

* * * * *